Nov. 26, 1929.                F. L. WILCOX                1,736,842
                                 TANK
                          Filed Sept. 19, 1927

INVENTOR
Fred L. Wilcox
BY Arthur O. Brown
ATTORNEY

Patented Nov. 26, 1929

1,736,842

UNITED STATES PATENT OFFICE

FRED L. WILCOX, OF TULSA, OKLAHOMA

TANK

Application filed September 19, 1927. Serial No. 220,443.

My invention relates to separating tanks and more particularly to a tank of that character for storage of crude oil having heavy basic sediment; the principal object of the invention being to facilitate separation of the elements of different specific gravity while the oil is in storage and insure substantially complete removal of the highly viscous sediment accumulated on the bottom of the tank.

In accomplishing the above and other objects of the invention I have provided improved details of structure, the preferred forms of which are illustrated in the accompanying drawings, wherein.

Figure 1:
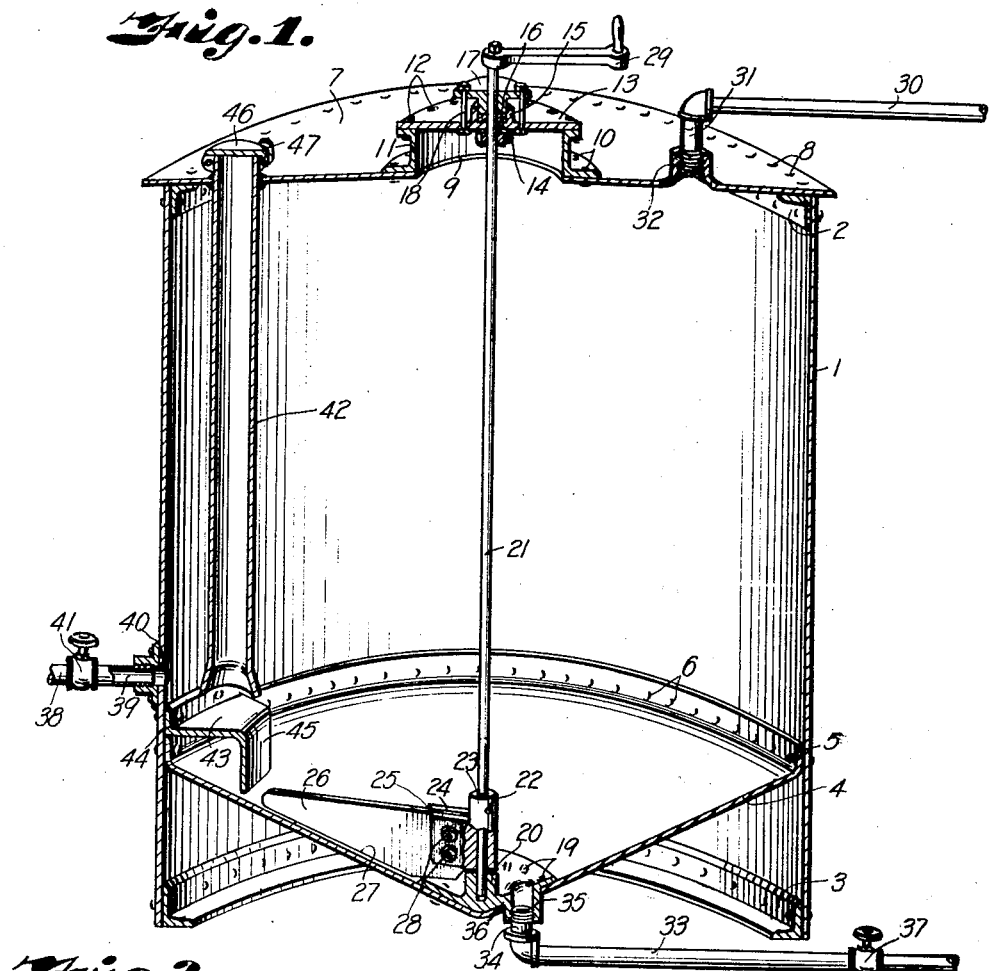
Fig. 1 is a perspective view in central vertical section, of a separator tank constructed in accordance with my invention.

Referring more in detail to the drawings:

1 designates the body of the tank, preferably cylindrical in cross section and having top and bottom stiffening flanges 2 and 3. Located within the body 1 is an inverted conical bottom 4, having a rim flange 5 attached to the wall of the body member, preferably by rivets 6, and sealed in any suitable manner to provide a fluid-tight receptacle.

Enclosing the top of the tank is a cover 7, preferably attached to the flange 2 by rivets 8 and having a central manhole 9. Attached to the cover 7, by rivets 10, is a ring 11 and attached to the ring, by bolts 12, is a manhole cover 13, having a central aperture 14 surrounded by a flange 15 forming a cup for packing 16. 17 designates a gland adjustable on the packing 16 by bolts 18, extending through the flange head and manhole cover.

Seated in the apex of the bottom 4 and attached thereto by rivets 19 is a bearing member 20. Journaled in the aperture 14 of the manhole cover and within the bearing 20 on the tank bottom is a shaft 21. Fixed to the shaft by a set screw 22 in a bracket 23, preferably provided with a bifurcated wing 24 for receiving the shank 25 of a blade 26, which extends over the tank bottom and has a scraping edge 27 inclined to lie substantially parallel with the inclined bottom member. The shank of the scraping blade is secured to the bracket by bolts 28 which extend through the bracket and wing to hold the blade securely to the bracket but provide for removal thereof for replacement or repair.

The shaft 21 extends above the top cover of the tank and is provided with a handle 29 whereby the shaft may be rotated to move the scraping blade over the bottom of the tank to loosen material accumulated thereon and to direct the same to an outlet opening.

30 designates a supply line leading to the tank through a nipple 31 threaded into a collar 32 on the cover 7. 33 designates an outlet line for the heavy element or basic sediment which has settled to the bottom of the tank, the line 33 preferably opening to near the apex of the bottom member 5 through a nipple 34 threaded into a collar 35 cast integral with the lower bearing member 20 and extending through an opening 36 in the bottom 5, the outlet pipe being provided with a valve 37 for controlling flow therethrough.

38 designates an outlet pipe for the lighter element of the fluid and which preferably opens through a nipple 39 attached to the body of the tank above the bottom flange 5 and communicating with an opening 40 in the wall of the tank. The pipe 38 is also provided with a control valve 41 for controlling outlet therethrough.

42 designates a gauge tube depending from the tank cover 7 to a point slightly below the outlet for the lighter components of the fluid and above a shelf 43, attached to the wall of the tank by rivets 44 and having a depending flange 45 resting on the inclined bottom 4, the upper end of the tube being closed by a lid 46 hinged to the tube above the cover 7 and normally closed by a latch 47.

When a tank of the construction described is employed for storage of crude oil flowed thereto direct from the well and containing heavier components, such as basic sediment, the oil will separate by gravity, the heavier components sinking to the bottom and accumulating on the conical bottom 4. When the tank is to be drained, the lighter elements may be drawn off through the upper outlet 40 and the heavier elements through the lower outlet 36, under control of the valves 37 and 41. The basic sediment which has settled onto the tank bottom being highly viscous, will not flow to outlet and in order to facilitate its removal the scraper plate is moved over the inclined bottom by rotation of the shaft 21 to move the sediment to the outlet opening so that it may drain therethrough.

The shelf 43 located above the conical bottom of the tank serves as a stop for a gauge, so that contents of the tank may be gauged without projection of the gauge rod into the heavy sediment on the bottom of the tank, and with accuracy because of abutment of the rod against a horizontal plane, as distinguished from the inclined bottom of the tank, thereby providing an accurate reading.

Figure 2:
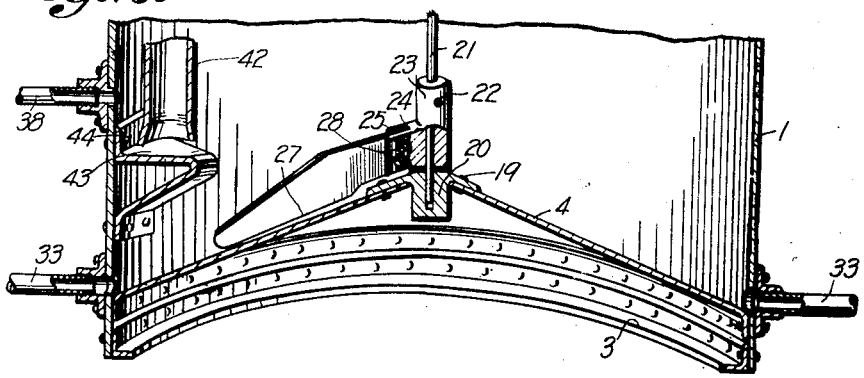
Fig. 2 is a similar view of the lower portion of a tank having a modified form of bottom.

While I have shown the preferred form of the invention as including the inverted conical bottom with the gauge shelf resting on the bottom, it is apparent that the projection of the bottom may be reversed and the gauge shelf attached entirely to the side wall of the tank, as illustrated in Fig. 2 and without departing from the spirit of the invention.

What I claim and desire to secure by Letters Patent is:

1. In a tank of the character described, including a cylindrical body having a conical bottom, a cover on said body having a manhole concentric with the bottom, a cover for the manhole, concentric bearings on the bottom and manhole cover, a shaft journaled in said bearings, a bracket on the lower end of said shaft, an agitator blade on said bracket having a scraping edge inclined to substantially parallel the bottom, means on said shaft exterior to the tank for rotating the shaft, means for supplying the tank, and means for drawing off contents of the tank at different levels, the tank having a lower opening offset from the axis thereof for drawing off contents at the lowest level.

2. In a tank of the character described including a cylindrical body having a conical bottom, a cover on said body having an opening, a lid for the opening, concentric bearings on the bottom and lid, a shaft rotatable in said bearings, a bracket on said shaft, an agitator blade on said bracket having a scraping edge inclined to substantially parallel the bottom, means on said shaft exterior to the tank for rotating the shaft, means for supplying the tank, and means for drawing off contents of the tank at varying levels, including an outlet pipe having an opening offset from the axis at the lowest level of the tank.

In testimony whereof I affix my signature.

FRED L. WILCOX.